United States Patent Office 3,574,157
Patented Apr. 6, 1971

3,574,157
COATING COMPOSITION OF EPOXY RESINS, POLYESTER RESINS, AND VINYL MONOMERS
Fred Markus, 4343 Finley Ave., Los Angeles, Calif. 90027
No Drawing. Filed Feb. 3, 1969, Ser. No. 796,223
Int. Cl. C08f 45/52
U.S. Cl. 260—28.5
9 Claims

ABSTRACT OF THE DISCLOSURE

An improved liquid stable resinous coating composition polymerized by an epoxy converter to a solid durable coating having controlled flexibility is provided. The composition comprises liquid epoxy resin curable at ambient temperature with a converter such as an amine and a specified volume concentration of a liquid unsaturated polyester at least essentially free of triglyceride oil and fatty acid and comprising the reaction product of polybasic acid and polyhydric alcohol, at least one of the acid and alcohol being unsaturated, in a concentration sufficient to increase the flexibility of the composition, and a promoter for the polyester. Composition is, in part, characterized by being free of a catalyst for the polyester and at least essentially free of volatile solvent. The composition is capable of being spread as a coating on a surface and cured at ambient temperature to a durable solid surface having controlled flexibility by adding the epoxy converter to the liquid composition before coating. Prior to such addition the composition can be maintained over a considerable period of time without thickening. The invention also includes a method of coating utilizing the composition.

---

The present invention is directed to a liquid resinous coating composition and to a method of coating, utilizing said composition and an epoxy converter. The composition, upon addition of the converter in accordance with the method, sets to a solid durable coating having controlled flexibility. The composition comprises liquid epoxy resin in an amount of at least about 20 volume percent of the composition, including a converter. Liquid unsaturated polyester resin at least essentially free of triglyceride oil and fatty acid is also present in about 1:4–3:2 volume ratio to the epoxy resin. Liquid comonomer solvent such as styrene for the polyester resin and organic salt promoter for the polyester resin are also present, but catalyst, such as a peroxide for the polyester resin, is at least essentially absent. The composition includes an epoxy converter and may also include a sealing agent, such as wax, to protect the composition against atmospheric oxygen, and/or a filler, such as silica sand, to reduce the concentration of resinous constituents.

Most resinous base liquid coating compositions for use in preparing floor coverings contain volatile solvents and, hence, are subject to considerable shrinkage as the solvents evaporate during setting and hardening of the coatings. The same is true of certain liquid compositions for use in preparing coverings for walls, furniture and other surfaces. Typical liquid resinous coating compositions employ, for example, urethane-type resins and solvents for the same because of their low cost. However, such compositions must be applied laboriously in relatively thin layers and must be thoroughly set, layer by layer, to prevent entrapment of bubbles of solvent; otherwise, peeling of the set coatings, bleed through of soluble contaminants and other problems occur. Suitably durable floor coverings and other protective surfaces capable of withstanding considerable wear can be prepared from conventional resinous coating compositions only by spaced multiple applications. Many hours of settings are required between applications and, hence, the labor cost of preparing such coverings in situ is relatively large.

Epoxy resins, although not usually employing volatile solvent systems, are unsatisfactory for use as protective coverings, especially those subject to impact, such as floors, etc., because they are very brittle in the hardened polymerized state. Moreover, they are usually relatively expensive. Polyester resins, although much less expensive than epoxy resins, have the disadvantage of exhibiting, when polymerized, very poor adhesivity and are also brittle. Accordingly, peeling, cracking, and chipping of coverings formed from such resins frequently occur.

Accordingly, it would be desirable to provide relatively inexpensive liquid resinous coating compositions capable of being set to durable, scratch and chip-resistant solid coverings readily adherent to a wide variety of substrates such as glass, wood, metal, ceramics, plaster, concrete and the like. Preferably such compositions should be capable of being applied in relatively thick coatings and of setting within reasonably short periods of time. Preferably, their formulations should be capable of being adjusted to provide the compositions with controlled flexibility so as to make them adaptable to a wide variety of uses. It would also be desirable if such compositions could be used as adhesives, bonding agents and laminating means, for example, in the manufacture of furniture, archery bows and the like.

Such improved liquid resinous coating compositions have now been provided by the present invention. They are capable of controlled flexibility, are firmly adherent to and cohesive with a wide variety of substrates, are inexpensive, durable, scratch and chip-resistant, and are simple to store and to apply rapidly in thick coatings. The total time expended to provide relatively thick set coatings is much shorter utilizing such compositions than with most conventional coating compositions.

Accordingly, it is the principal object of the present invention to provide improved liquid resinous coating compositions. It is also an object of the present invention to provide an improved method of forming a durable crack and scratch-resistant solid resinous coating having controlled flexibility.

It is a further object of the present invention to provide improved liquid resinous coating compositions which can be applied in relatively thick layers capable of setting to flexible, durable, scratch and crack-resistant films on a wide variety of substrates without entrapment of bubbles, bleed-through and consequent peeling.

It is also an object of the present invention to provide a method of inexpensively coating floors, walls and the like with liquid resinous coating compositions having in the set state controlled flexibility, durability and resistance to impact without cracking or scratching.

Further objects and advantages of the present invention will be apparent from a study of the following detailed description.

The liquid coating composition of the present invention is generally as described above.

Now referring more particularly to such coating composition and the components thereof, the epoxy resin in the composition is at least essentially solvent free and is in liquid form and may be any suitable epoxy resin, such as, for example the reaction product of bisphenol A and epichlorohydrin. Other suitable epoxy resins employing the reaction product of aliphatic glycols, such as ethylene glycol in place of bisphenol A, with epichlorohydrin can be used. A typical commercially available epoxy resin suitable for the present purposes is sold under the trademark Epi-Rez 509 by Jones-Dabney Company division of Devoe & Raynolds Company, Inc., Los Angeles, California. This resin is unmodified diglycidyl ether of bisphenol A. It has the physical characteristics set forth in Table I below:

TABLE I

Viscosity at 77° F.: 7,000–10,000 cps.
Wt. per gallon: 9.67±.05 lbs.
Color (Gardner-Holdt): 3 max.
Wt. per epoxide: 178–193
Hydrolyzable chlorine: 0.01% max.
Flash Point (approx.): 470° F.

Another suitable liquid epoxy resin is sold under the trademark Epi-Rez 508 by the above indicated company and is similar in composition to Epi-Rez 509, but has the physical characteristics set forth in Table II below:

TABLE II

Viscosity at 77° F.: 3,600–5,500 cps.
Wt. per gallon: 9–67±.05 lbs.
Color (Gardner-Holdt): 1 max.
Wt. per epoxide: 171–177
Hydrolyzable chlorine: 0.05% max.
Total chlorine: 0.20%

A further suitable liquid epoxy resin is sold under the trademark Epi-Rez 510 by the above indicated company, and is a bisphenol A resin (reaction product of bisphenol A and epichlorohydrin-mol ratio 1:2) having the physical characteristics set forth in Table III below.

TABLE III

Viscosity at 77° F.: 10,000–16,000 cps.
Wt. per gallon: 9.67±.05 lbs.
Color (Gardner-Holdt): 3 max.
Wt. per epoxide: 185–200
Hydrolyzable chlorine: 0.1% max.
Flash point (approx.): 470° F.

Other conventional types of epoxy resin, preferably those which are unmodified, can be used in the liquid form in the present composition. Selection of appropriate epoxy resins is within the skill of one versed in the resinous coating composition art. Obviously, the epoxy resin selected should have a viscosity sufficiently low to make it readily spreadable. It should also set with a converter in a reasonable amount of time to a durable surface. Most conventional epoxy resins used as protective films have such characteristics and are suitable for the present purposes.

The liquid epoxy resin in the present composition must be present in a concentration of at least about 20 percent by volume of the composition, including the epoxy converter (which is added only when the composition is to be used) in order to secure the advantages of the invention. In this regard, if the epoxy resin is present in a concentration below that minimum, then the composition is characterized by poor adhesivity to various surfaces such as glass, wood, concrete, metal and the like. Moreover, the scratch resistance of the composition in the set state is definitely impaired.

The maximum concentration for the epoxy resin in the present composition is limited to that at which brittleness in the set coating appears. Between these two limits, the ratio of epoxy resin to polyester resin is varied to control the coating flexibility, more polyester resulting in greater flexibility. Selected polyester resin must be added to the composition to impart sufficient flexibility to the composition to prevent chipping and cracking under normal use, and to reduce the cost of the composition; too much polyester results in the described loss of adhesivity. Too little polyester results in the described brittleness.

Usually at least 15 to 25 percent by volume of the total composition of the invention, including converter, constitutes the selected polyester resin. Accordingly, the epoxy resin is not present in a concentration larger than about 30 percent by volume of the total composition (including converter) when a filler is used in the composition in a substantial amount, such as about 30–40 percent by volume. It is preferred that for most purposes, the epoxy resin be present in a volume ratio to the polyester resin of about 1:1–1:2, because the epoxy resin is relatively expensive, in contrast to the polyester resin and other constituents of the composition. Concentrations of about 23–26 volume percent are for example suitable and typical for the epoxy resin when the composition is used to prepare floor coverings and contains substantial amounts of filler. When no filler is present, the epoxy resin usually is present in a volume concentration in the composition of about 35–40 percent, with the polyester resin, comonomer and converter constituting essentially the remainder, except for a very minor concentration of polyester promoter.

The type of polyester resin suitable for present purposes is unsaturated polyester resin formed of polybasic acid and polyhydric alcohol one or both of which is unsaturated or a mixture of saturated and unsaturated components. In any event, the polyester resin contains essentially no triglyceride oil and no fatty acids, preferably no trace of such and, accordingly, is of a distinct and separate class from saturated polyesters. It is at least also essentially free of volatile solvent and preferably totally free of the same. In the present composition, it is preferred to use resin produced by reacting dibasic acid with dihydric alcohol. Suitable dibasic acids for this purpose include maleic anhydride, fumaric acid, phthalic anhydride, isophthalic acid, adipic acid, azelaic acid and the like. Suitable dihydric alcohols for this purpose include ethylene glycol, propylene glycol, triethylene glycol, diethylene glycol, dipropylene glycol, butylene glycol and the like. Other polybasic acids and polyhydric alcohols can be used provided that the resulting polyester resin or mixture of polyester resins is unsaturated, preferably containing essentially only unsaturated polyesters. The polyester resin may be, for example, a mixture of the reaction products of phthalic anhydride (148 parts), maleic anhydride (98 parts) and propylene glycol (164 parts), all by weight.

The viscosity of the polyester resin is controlled by the concentration of co-monomer polymerizable solvent for the polyester present therewith in the composition. Such solvent is non-volatile and may regulate the resin viscosity within a wide range. When in the above typical formula for polyester resin, styrene co-monomer is added in an amount of 180 parts or approximately ⅓ by weight weight (and volume) of the total polyester resin composition, the resin viscosity is reduced to approximately 800 cps. A typical polyester resin having the above described formula and including styrene in the indicated amount is hereafter identified as polyester A.

The co-monomer may be any one of a number of suitable materials, such as styrene, which is the least expensive and most widely used, or diallylphthalate, methyl methacrylate, vinyl toluene, chlorostyrene, methyl styrene, divinyl benzenes, triallyl cyanurate or the like. The latter co-monomers however, are relatively more expensive than styrene. As indicated, the concentration of the co-monomer varies, depending upon the desired viscosity for the polyester resin. The co-monomer is a cross-linking agent, as well as diluent and, hence aids in the setting of the polyester component of the composition. Although the co-monomer usually is present in about 50 parts per 100 parts by volume of the polyester resin, it may be present in greater or lesser concentration, for example, from about 5 to 100 parts per 100 parts by volume of the polyester resin.

The composition further includes the customary small but effective concentration of a promoter for the polyester resin so that it can be set or polymerized to a hard film with the epoxy resin in the composition at room temperature. The promoter may be any conventional promoter, usually an organic salt such as cobalt naphthenate or cobalt octoate. The concentration of promoter depends on the amount and type of polyester present and other factors, all wtihin the skill of those ordinarily versed in the resinous coating art; i.e. a relatively small concentration for example 0.5 percent of a 6 percent solution by volume of the polyester in the composition. Other suitable concentrations for the promoter are within the skill of those versed in the art.

A sealing composition or agent such as paraffin wax or other wax may be present, if desired, to keep the liquid composition sealed from contact with atmospheric oxygen until copolymerization between the styrene and polyester resin is complete. The paraffin wax floats to the top of the liquid resin to form the required sealing film.

It should be noted that essentially no catalyst, such as peroxide, and preferably none whatsoever is present in the composition. In any event insufficient catalyst is present to catalyze polymerization of a significant portion of the polyester resin. In fact, if a catalyst for the polyester, such as organic peroxide, were employed, the composition when set would not exhibit the improved flexibility, resiliency, adhesivity and durability characteristic of the composition. Instead, the composition would have poor adhesivity and other typical characteristics of catalyzed polyester resins. Thus, it is unsuitable to cause the usual catalyzed polymerization of the polyester resin (via a catalyst) when the composition is being set. Instead, it is believed, although the present invention is not limited to such belief, that the styrene and promoter merely facilitate gradual polymerization of the polyester within the rapidly hardening matrix of polymerized epoxy resin. The polyester thus acts as a flexibilizing agent for the composition. The polymerization of the polyester in this manner is not as extensive as is induced by catalysts and, hence, is suitable, as opposed to catalyzed polymerization.

The basic liquid composition is set to a durable solid state by the addition thereto of an epoxy converter. The converter for the epoxy resin may be any suitable epoxy converter for example, an amine, either aliphatic or aromatic, Lewis acid, a mercaptan or anhydride, a phenol or the like. It may be present in the liquid composition in any suitable concentration for example 5 to 40 percent by volume of the epoxy resin. In one typical system, it is used in a concentration of about ⅓ that of the epoxy resin. In any event, it should be present in an amount sufficient to substantially polymerize the epoxy resin present in the composition. It will be understood that the converter is not added until it is desired to apply the composition to a surface. When the unset liquid composition to which the converter has been added is spread on a surface, the epoxy resin polymerizes, as does to some extent the polyester resin, to provide the desired protective covering.

The composition may include a filler material which is inert, such as sand (silica sand), clay, glass fibers, bentonite or the like. Preferably, the inert filler is finely divided so as to be easily suspended within the liquid composition, and the set composition. The filler may be present in any suitable concentration and, if present, is usually in about 10 percent by volume concentration or more in order to reduce substantially the resin concentration and, hence, the cost of the composition. Silica sand, for example a mixture of 90 and 250 grit size, when present in a concentration of up to more than 40 percent by volume but less than about 50 percent by volume in the composition, effectively reduces the cost of the composition while not interfering with the desirable properties thereof, including flexibility, bondability and durability. The filler should not be present in an amount sufficient to materially impair these properties of the composition. Concentrations of the filler above about 50 volume percent usually are undesirable, although they can be tolerated in some instances. Thus, it is preferred that the resinous constituents of the composition be present in a combined volume concentration which is a major proportion.

Accordingly, a composition is provided which includes an epoxy resin and a polyester resin, a promoter for the latter and a comonomer for the same, which composition may further include a sealing agent, if desired, and/or a filler. Such composition (minus the converter) has improved shelf life over the usual polyester resins commercially available, since setting to a solid state, a common problem with those commercial resins, is avoided over a reasonable period of time. The epoxy resin in the present composition apparently acts as a buffer against such setting during storage. The composition when combined with the converter is usable as an adhesive, laminating agent and bonding agent. It can be formulated as a clear coating to which can be added, after spreading on a surface, decorative matter such as colored chips or beads of stone, metal, glass, vinyl or the like. Moreover, in the set state, the coating, whether or not containing inclusions, is hard, though resilient, crack-free, chip-resistant, and scratch resistant in contrast to conventional polyester-containing coatings which readily scratch and mar.

The following examples illustrate certain features of the present invention:

EXAMPLE I

A typical composition of the invention, containing the ingredients set forth in Table IV below was prepared by mixing said ingredients together:

TABLE IV

|  | Percent by volume |
|---|---|
| Epoxy resin[1] (225 lbs.) | 23 |
| Polyester resin[2] (300 lbs.) | 33 |
| Silica sand (800 lbs.) | 36 |
| Cobalt naphthenate 2 lbs. (6% solution) | 0.5 |

[1] EPI-REZ 509.
[2] Polyester A.

The composition set forth in Table IV above was mixed with 60 lbs. (7.5% by volume) of triethylene tetramine converter for the epoxy resin. The Polyester A already contained styrene (one third of its volume). The resulting liquid was spread as a 50 mil thick layer on a smooth glass plate and on paper towels, and allowed to set at room temperature (70° F.) to a hardened solid state. It was found that the film had hardened in about 4 hours, tenaciously adhered to the glass and paper, could not be readily scraped from either substrate with a knife and yet was resilient and flexible, as demonstrated by bending of the coating and paper towel. It was scratch resistant, crack-free and resistant to chipping. The coating in the set state was useful for a wide variety of purposes, including permanent floor coverings, table and other furniture finishes, sink finishes and as a tile substitute. When the coating upon application to a surface was sprinkled with vinyl chips, the product, when set was permanent and attractive.

EXAMPLE II

A liquid coating composition having the constituents set forth in Table V below was prepared by mixing them together:

TABLE V

|  | Percent by volume |
|---|---|
| Epoxy resin[1] (250 lbs.) | 26 |
| Polyester resin[2] (280 lbs.) | 30 |
| Silica sand (800 lbs.) | 36 |
| Cobalt naphthenate (0.9 lbs.) | 0.3 |

[1] EPI-REZ 509.
[2] Polyester A.

The above composition was mixed with 66 lbs. (8% by volume) of triethylene tetramine and then a portion was spread on clear smooth glass and on paper towels as a 45 mil thick film. The drying time was found to be slightly less than 4 hours. At the end of that time the glass was observed to be translucent. The coating thereon was solid, adherent thereto and could not be scraped off with a knife. The film on the towels was resilient, flexible and both films were crack-free and chip- and scratch-resistant. Flexibility of the film was somewhat less than for the film of Example I.

In a parallel test, the same composition as that of Table V was prepared, except that the epoxy resin content was lowered to 150 pounds and the polyester A content was increased to 400 lbs. This composition was mixed with 40 lbs. of triethylene tetramine and then a portion of it was spread on a smooth glass surface and on paper towels and allowed to harden (about 3 hours). Thereafter the translucent film was found to have poor adhesivity to the glass (it could be easily scraped off) and thus was unsuitable. The coating was more flexible than those of Examples I and II.

Separate parallel tests substituting one variable at a time and various concentrations of the ingredients within the limits set forth above demonstrated the equivalency of the following as illustrative of the scope of the present invention: Epi-Rez 508 and 510 were substituted for Epi-Rez 509; Aropol 7522 and Aropol 7720M, trademarked polyesters of Archer Daniels Midland Company, Minneapolis, Minnesota were substituted for polyester A; bentonite, attapulgite clay, dolomite powder and fiberglass cuttings were substituted for silica sand; diallyl phthalate, methyl metacrylate, vinyl toluene and chlorostyrene were substituted for the styrene; cobalt octoate was substituted for the cobalt naphthenate; and various aliphatic and aromatic amines, including diethylene triamine. Lewis acids and mercaptans were substituted for the triethylene tetramine. Further tests in which the filler was eliminated showed similar results.

The Aropol 7522 polyester resin had the characteristics set forth in Table VI below:

TABLE VI

Styrene content: 30±1%
Viscosity at 77° F., Brookfield #3 spindle at 30 r.p.m.: 800±200 cps.
Color: Promoted
Specific gravity, 25/25° C.: 1.12
Weight per gal. at 25° C.: 9.3 lbs.
Acid number at 30% styrene: 22±2

The AROPOL 7720M resin had the physical characteristics set forth in Table VI below:

TABLE VII

Styrene content: 35±1%
Viscosity at 77° F., Brookfield #3 spindle at 30 r.p.m.: 450±50 cps.
Color, Gardner: 2 max.
Specific Gravity 25/25° C.: 1.13
Weight per Gal. at 25° C.: 9.4–9.5 lbs.
Acid at 35% styrene: 13±3
Acid value—solids: 17–23
Stability at 250° F.: 5±1 hr.

EXAMPLE III

The composition set forth in Example I was varied as to proportion of ingredients as set forth in Table VIII below:

TABLE VIII

| (Samples) | Percent by volume | | | | |
| --- | --- | --- | --- | --- | --- |
| | A | B | C | D | E |
| Epoxy resin | 36 | 18 | 45 | 35 | 20 |
| Polyester resin [1] | 9 | 51 | 9.5 | 35 | 30 |
| Filler | 40 | 0 | 25 | 0 | 28 |
| Epoxy converter | 10 | 6 | 15.5 | 12 | 6.5 |
| Styrene | 4.5 | 24 | 4.5 | 17.5 | 15 |
| Cobalt naphthenate | 0.5 | 0.5 | 0.5 | 0.5 | 0.5 |

[1] Polyester A except for styrene inclusion.

In preparing each sample, the constituents were mixed together, and thereafter each sample was coated at a 40 mil thick film on smooth glass and on paper towels, as well as smooth aluminum, fired brick, a concrete block, plywood and on a plastered surface. After each sample set on the particular surface, its appearance, scratch resistance (with a nail), chip resistance (with a hammer), flexibility (on paper towels by bending same) and wear resistance were determined.

It was found that compositions A, D and E were crack free, smooth, hard, durable, chip- and scratch-resistant. Each adhered strongly to the substrate. Composition A was least flexibile, and Composition E most flexible of these three. Composition D exhibited the best combination of strong adhesivity, flexibility, impact resistance, scratch- and chip-resistance, and was most suitable for floor coverings.

Composition Band C were unsatisfactory, the former exhibiting great flexibility but little adhesivity and scratch resistance, and the latter being very brittle with little flexibility. The presence (Compositions A, C and E) or absence (Compositions B and D) of filler had little to do with the characteristics of the compositions (Samples), the highest concentration of filler being only 40 volume percent.

The above results demonstrated the necessity of having the epoxy resin present in the composition in a volume ratio to the polyester resin of at least about 2.3 (see Sample B where the ratio is 1:2) and the undesirability of increasing the epoxy resin ratio to above about 4:1 to the polyester (see Sample C where the volume ratio is 4.5:1). Best results are obtained when the ratio is about 1:1 (see Sample D). Previous tests confirmed the necessity of having at least about 20 volume percent epoxy resin in the total composition. When the proper resin ratio is present, the advantages of the invention are obtained, comprising substantial improvements in the physical characteristics over those of compositions containing either only epoxy resin systems or polyester resin systems, particularly for surface covering applications.

It has been found that the present composition with the converter therein can be used as a coating composition for walls, floors, both exterior and interior, and other applications, although principally useful for interior floor coverings. The composition in liquid form can be easily applied in relatively thick coatings to a variety of surfaces, which coating when set does not shrink appreciably, crack, scratch, peel, dent, allow bleed through of sub-surface materials or wear readily. It is capable of being readily colored by pigments and of supporting various inclusions of solid materials. It sets more rapidly per thickness (usable) than most coating materials which include resins, since it can be applied in relatively thick layers without requiring laborious multiple applications with thin layers and long setting times between layers. It does not contain any appreciable amount of the volatile solvents with which most resin coating systems are comprised. Moreover, it clings tenaciously to a variety of substrates and provides a very durable surface. The composition can be adjusted to control its physical properties, including flexibility, adhesivity and the like. Fillers can be added up to a reasonable concentration. It has been found to be useful as an adhesive, bonding and laminating agent for archery bows and other applications.

Accordingly, an improved coating composition and method of coating are provided herein. Various changes, alterations, additions, and modifications can be made in the coating composition and steps of the method. All such changes as are within the scope of the present invention form a part of the present invention.

What is claimed is the following:

1. An improved liquid, stable, resinous coating composition polymerizable by an epoxy converter to a solid durable coating having controlled flexibility, said coating composition comprising:
  (a) liquid epoxy resin curable at ambient temperature with a converter, said epoxy resin being in a concentration, by volume of said composition, of at least about 20 percent and comprising unmodified diglycidyl ether of bisphenol A;
  (b) liquid unsaturated polyester resin, essentially free of triglyceride oil and fatty acid and comprising the reaction product of polybasic acid and polyhydric alcohol, wherein at least one of said acid and alcohol is unsaturated, said polyester being in a concentration sufficient to increase the flexibility of said composition;
  (c) co-monomer polymerizable solvent for said polyester resin in an amount sufficient to react with a substantial proportion of said polyester resin; and
  (d) promoter for said polyester resin comprising organic salt in an amount sufficient to promote polymerization of said polyester resin,
said composition being free of catalyst for said polyester resin.

2. An improved liquid, stable, resinous coating composition polymerizable by an epoxy converter to a solid durable coating having controlled flexibility, said coating composition comprising:
  (a) liquid epoxy resin curable at ambient temperature with a converter, said epoxy resin being in a concentration, by volume of said composition, of at least about 20 percent and comprising the reaction product of bisphenol A and epichlorohydrin;
  (b) liquid unsaturated polyester resin, essentially free of triglyceride oil and fatty acid and comprising the reaction product of polybasic acid and polyhydric alcohol, wherein at least one of said acid and alcohol is unsaturated, said polyester being in a concentration sufficient to increase the flexibility of said composition;
  (c) co-monomer polymerizable solvent for said polyester resin in an amount sufficient to react with a substantial proportion of said polyester resin; and,
  (d) promoter for said polyester resin comprising organic salt in an amount sufficient to promote polymerization of said polyester resin,
said composition being free of catalyst for said polyester resin.

3. An improved liquid, stable, resinous coating composition polymerizable by an epoxy converter to a solid durable coating having controlled flexibility, said coating composition comprising:
  (a) liquid epoxy resin curable at ambient temperature with a converter, said epoxy resin being in a concentration, by volume of said composition, of at least about 20 percent and comprising unmodified diglycidyl ether of bisphenol A;
  (b) liquid unsaturated polyester resin, essentially free of triglyceride oil and fatty acid, and comprising the polymerized reaction product of saturated dihydric alcohol and unsaturated dicarboxylic acid in a concentration such that the volume ratio of said epoxy resin to said polyester resin is about 1:1–2:1;
  (c) co-monomer polymerizable solvent for said polyester resin in an amount sufficient to react with a substantial proportion of said polyester resin; and,
  (d) promoter for said polyester resin comprising organic salt in an amount sufficient to promote polymerization of said polyester resin,
said composition being free of catalyst for said polyester resin.

4. An improved liquid, stable, resinous coating composition polymerizable by an epoxy converter to a solid durable coating have controlled flexibility, said coating composition comprising:
  (a) liquid epoxy resin curable at ambient temperature with a converter, said epoxy resin being in a concentration, by volume of said composition, of at least about 20 percent and comprising the reaction product of bisphenol A and epichlorohydrin;
  (b) liquid unsaturated polyester resin, essentially free of triglyceride oil and fatty acid, comprising the polymerized reaction product of saturated dihydric alcohol and unsaturated dicarboxylic acid in a concentration such that the volume ratio of said epoxy resin to said polyester resin is about 1:1–2:1;
  (c) co-monomer polymerizable solvent for said polyester resin in an amount sufficient to react with a substantial proportion of said polyester resin; and,
  (d) promoter for said polyester resin comprising organic salt in an amount sufficient to promote polymerization of said polyester resin,
said composition being free of catalyst for said polyester resin.

5. An improved liquid, stable, resinous coating composition polymerizable by an epoxy converter to a solid durable coating having controlled flexibility, said coating composition comprising:
  (a) liquid epoxy resin curable at ambient temperature with a converter and present in a concentration of about 23–26 volume percent in the composition and comprising the reaction product of bisphenol A and epichlorohydrin;
  (b) liquid unsaturated polyester resin, essentially free of triglyceride oil and fatty acid and comprising the reaction product of phthalic anhydride, maleic anhydried and propylene glycol in a concentration of about 20–22 volume percent in said composition;
  (c) styrene co-monomer for said polyester resin in a concentration of about 10–11 volume percent in the composition;
  (d) cobalt naphthenate promoter for said polyester resin;
  (e) paraffin wax protective surface sealing agent in an amount sufficient to surface seal the composition and prevent inhibition of copolymerization of said polyester resin and comonomer; and
  (f) inert particulate silica sand filler in a concentration of about 36 volume percent in said composition,
said composition being free of catalyst for said polyester resin.

6. A method of forming an improved, durable solid coating having controlled flexibility, which method comprises forming a uniform, stable liquid composition comprising:
  (a) liquid epoxy resin in a concentration, by volume of said composition, of at least about 20 percent and comprising unmodified diglycidyl ether of bisphenol A;
  (b) liquid unsaturated polyester resin, essentially free of triglyceride oil and fatty acid, and comprising the reaction product of polybasic acid and polyhydric alcohol wherein at least one of said acid and alcohol is unsaturated, said polyester resin being in a concentration sufficient to increase the flexibility of said composition;
  (c) co-monomer polymerizable solvent for said polyester resin in an amount sufficient to react with a substantial proportion of said polyester resin; and,
  (d) promoter for said polyester resin comprising organic salt in an amount sufficient to promote polymerization of said polyester resin,
said composition being essentially free of catalyst for said polyester resin, uniformly distributing throughout said composition epoxy converter in an amount sufficient to polymerize said epoxy resin and set said composition to a solid state, and at about ambient temperature coating the resulting liquid composition on a surface and setting said coating to a hardened durable coating having controlled flexibility.

7. A method of forming an improved, durable solid coating having controlled flexibility, which method comprises forming a uniform, stable liquid composition comprising:
- (a) liquid epoxy resin in a concentration, by volume of said composition, of at least about 20 percent and comprising the reaction product of bisphenol A and epichlorohydrin;
- (b) liquid unsaturated polyester resin, essentially free of triglyceride oil and fatty acid, and comprising the reaction product of polybasic acid and polyhydric alcohol wherein at least one of said acid and alcohol is unsaturated, said polyester resin being in a concentration sufficient to increase the flexibility of said composition;
- (c) co-monomer polymerizable solvent for said polyester resin in an amount sufficient to react with a substantial proportion of said polyester resin; and,
- (d) promoter for said polyester resin comprising organic salt in an amount sufficient to promote polymerization of said polyester resin, said composition being essentially free of catalyst for said polyester resin, uniformly distributing throughout said composition epoxy converter in an amount sufficient to polymerize said epoxy resin and set said composition to a solid state and at about ambient temperature coating the resulting liquid composition on a surface and setting said coating to a hardened durable coating having controlled flexibility.

8. A method of forming an improved durable solid coating having controlled flexibility, which method comprises forming uniform, stable liquid composition comprising:
- (a) liquid epoxy resin curable at ambient temperature with a converter, said epoxy resin being in a concentration, by volume of the composition, of at least about 20 percent and comprising unmodified diglycidyl ether of bisphenol A;
- (b) liquid unsaturated polyester resin, essentially free of triglyceride oil and fatty acid and comprising the polymerized reaction product of saturated dihydric alcohol and unsaturated dicarboxylic acid in a volume ratio of said epoxy resin to said polyester resin of about 1:1–2:1;
- (c) styrene co-monomer for said polyester resin in an amount sufficient to react with a substantial proportion of the polyester resin and reduce its density;
- (d) organic cobalt salt promoter for said polyester resin in an amount sufficient to promote polymerization of said polyester resin;
- (e) paraffin wax protective surface sealing agent in an amount sufficient to surface seal the composition and prevent inhibition of copolymerization of said polyester resin and co-monomer by atmospheric oxygen; and,
- (f) inert particulate silica sand filler in an amount sufficient to substantially reduce the resin concentration of said composition but insufficient to materially impair the adhesivity and strength of said composition, said composition being essentially free of catalyst for said polyester resin, uniformly distributing throughout said composition epoxy converter in an amount sufficient to polymerize said epoxy resin and set said composition to a solid state, and at about ambient temperature coating the resulting liquid composition on a surface and setting said coating to a hardened durable coating having controlled flexibility.

9. A method of forming an improved durable solid coating having controlled flexibility which method comprises forming a uniform, stable, liquid composition comprising:
- (a) liquid epoxy resin curable at about ambient temperature with a converter, said epoxy resin being present in a concentration by volume of said composition of about 23–26 percent and comprising the reaction product of bisphenol A and epichlorohydrin;
- (b) liquid unsaturated polyester resin, essentially free of triglyceride oil and fatty acid and comprising the reaction product of phthalic anhydride, maleic anhydride and propylene glycol in a concentration of about 20–22 volumes percent in said composition;
- (c) styrene co-monomer polymerizable solvent for said polyester resin in a concentration of about 10–11 volume percent of said composition;
- (d) cobalt naphthenate promoter for said polyester resin in an amount sufficient to promote polymerization of said polyester resin; and,
- (e) silica sand filler in a concentration of about 36 volume percent in said composition, said composition being essentially free of catalyst for said polyester resin, uniformly distributing throughout said composition triethylene tetramine in a concentration of about 8–9 percent by volume, and at about ambient temperature coating the resulting liquid composition on a surface and setting said coating to hardened durable coating having controlled flexibility.

References Cited

UNITED STATES PATENTS

| | | | |
|---|---|---|---|
| 2,829,191 | 4/1958 | Rogers | 260—837X |
| 2,965,602 | 12/1960 | Hicks | 260—837X |
| 3,211,695 | 10/1965 | Peterson | 260—835X |
| 3,217,066 | 11/1965 | Greenspan et al. | 260—836X |
| 3,455,858 | 7/1969 | Taft | 260—836X |

MORRIS LIEBMAN, Primary Examiner

L. T. JACOBS, Assistant Examiner

U.S. Cl. X.R.

260—835